US009583982B2

(12) United States Patent
Ashe et al.

(10) Patent No.: US 9,583,982 B2
(45) Date of Patent: Feb. 28, 2017

(54) AXIAL FLUX STATOR AND METHOD OF MANUFACTURE THEREOF

(71) Applicant: Bison Gear & Engineering Corp., St. Charles, IL (US)

(72) Inventors: Lester B. Ashe, Fort Wayne, IN (US); Matthew S. Hanson, Palatine, IL (US)

(73) Assignee: Bison Gear & Engineering Corp., St. Charles, IL (US)

( * ) Notice: Subject to any disclaimer, the term of this patent is extended or adjusted under 35 U.S.C. 154(b) by 0 days.

(21) Appl. No.: 15/014,142

(22) Filed: Feb. 3, 2016

(65) Prior Publication Data

US 2016/0329756 A1    Nov. 10, 2016

Related U.S. Application Data

(62) Division of application No. 12/512,734, filed on Jul. 30, 2009, now Pat. No. 9,287,739.

(51) Int. Cl.
| | |
|---|---|
| *H02K 15/02* | (2006.01) |
| *H02K 1/14* | (2006.01) |
| *H02K 15/12* | (2006.01) |
| *H02K 1/18* | (2006.01) |

(52) U.S. Cl.
CPC ............. *H02K 1/14* (2013.01); *H02K 1/182* (2013.01); *H02K 15/022* (2013.01); *H02K 15/12* (2013.01); *H02K 1/148* (2013.01)

(58) Field of Classification Search
CPC ...... H02K 1/148; H02K 1/182; H02K 15/022; H02K 15/10; H02K 15/14
USPC ............. 310/43, 216.015, 216.038, 216.057, 310/216.064, 216.069, 216.071, 216.074, 310/216.091, 268, 156.32, 156.33, 310/156.35, 156.37; 29/596
See application file for complete search history.

(56) References Cited

U.S. PATENT DOCUMENTS

| | | | | |
|---|---|---|---|---|
| 302,319 | A | * | 7/1884 | Brush ................... H02K 23/40 310/268 |
| 3,762,042 | A | * | 10/1973 | Abe ................... B22D 19/0054 29/598 |
| 4,006,375 | A | * | 2/1977 | Lyman, Jr. ............. H02K 37/08 310/268 |
| 4,095,150 | A | * | 6/1978 | Senckel ................. H02K 17/16 310/12.19 |
| 4,488,075 | A | * | 12/1984 | DeCesare .............. H02K 21/12 310/114 |

(Continued)

FOREIGN PATENT DOCUMENTS

| | | | | |
|---|---|---|---|---|
| EP | 1536542 A1 | * | 1/2005 | ............... H02K 1/18 |
| JP | 06327208 | * | 11/1994 | ............. H02K 15/12 |

*Primary Examiner* — Burton Mullins
(74) *Attorney, Agent, or Firm* — Garlick & Markison; Timothy W. Markison

(57) ABSTRACT

An axial flux stator includes a plurality of magnetically permeable members, a plurality of windings, a back iron, and an encasing. The plurality of windings is associated with the plurality of magnetically permeable members to produce a plurality of winding-magnetically permeable member assemblies. The back iron is mechanically butt joint coupled to the plurality of winding-magnetically permeable member assemblies. The encasing maintains the butt joint coupling of the back iron to the plurality of winding-magnetically permeable member assemblies.

7 Claims, 13 Drawing Sheets

(56) References Cited

U.S. PATENT DOCUMENTS

| | | | | | |
|---|---|---|---|---|---|
| 4,518,883 A * | 5/1985 | Oudet | H02K 7/20 310/268 |
| 4,578,606 A * | 3/1986 | Welterlin | H02K 29/14 310/156.05 |
| 4,996,457 A * | 2/1991 | Hawsey | H02K 21/24 310/112 |
| 5,729,065 A * | 3/1998 | Fremery | F16C 32/0414 310/156.32 |
| 5,903,082 A * | 5/1999 | Caamano | H02K 1/02 29/596 |
| 6,005,320 A * | 12/1999 | Kim | H02K 21/24 310/114 |
| 6,056,845 A * | 5/2000 | Rachkov | H02K 15/12 156/274.2 |
| 6,075,304 A * | 6/2000 | Nakatsuka | H02K 3/345 29/596 |
| 6,373,162 B1 * | 4/2002 | Liang | H02K 21/24 310/112 |
| 6,445,105 B1 * | 9/2002 | Kliman | H02K 1/14 310/156.35 |
| 6,809,453 B2 * | 10/2004 | Narita | H02K 17/02 310/216.008 |
| 2004/0119374 A1 * | 6/2004 | Carl, Jr. | H02K 17/165 310/268 |
| 2005/0179336 A1 * | 8/2005 | Hasebe | H02K 21/24 310/268 |
| 2006/0152104 A1 * | 7/2006 | Hino | H02K 21/028 310/268 |
| 2006/0273676 A1 * | 12/2006 | Naruse | H02K 21/24 310/156.32 |
| 2006/0273677 A1 * | 12/2006 | Horng | F04D 25/08 310/156.38 |
| 2006/0279150 A1 * | 12/2006 | Kojima | H02K 3/524 310/91 |
| 2007/0138904 A1 * | 6/2007 | Chae | H02K 1/148 310/268 |
| 2010/0225195 A1 * | 9/2010 | Asano | F04B 39/00 310/216.067 |

\* cited by examiner top view

AXIAL FLUX STATOR AND METHOD OF MANUFACTURE THEREOF

CROSS REFERENCE TO RELATED PATENTS

The present U.S. Utility Patent Application claims priority pursuant to 35 U.S.C. §121 as a divisional of U.S. Utility application Ser. No. 12/512,734, entitled "AXIAL FLUX STATOR AND METHOD OF MANUFACTURE THEREOF", filed Jul. 30, 2009, U.S. Pat. No. 9,287,739, which is hereby incorporated herein by reference in its entirety and made part of the present U.S. Utility Patent Application for all purposes.

STATEMENT REGARDING FEDERALLY SPONSORED RESEARCH OR DEVELOPMENT—NOT APPLICABLE

INCORPORATION-BY-REFERENCE OF MATERIAL SUBMITTED ON A COMPACT DISC—NOT APPLICABLE

BACKGROUND OF THE INVENTION

Technical Field of the Invention

This invention relates generally to electric motors and more particularly to stators.

Description of Related Art

As is known, there are various types of electric motors and an almost endless variety of uses for them. For instances, an electric motor may be an AC motor (e.g., synchronous or induction), a servo motor, a DC motor, or an electrostatic motor (e.g., magnetic motor) and may be used in applications that range from micro-mechanical systems (MEMS), to food processing equipment, to household appliances, to power tools, to automobiles, to toys, to large manufacturing equipment, etc. Basically any device that uses mechanical motion includes an electric motor.

Due to the vast uses of electric motors, they come in an almost endless variety of sizes, shapes, and power levels. For instance, the size of a MEMS motor is small enough to fit on an integrated circuit and supplies nano-watts of power, while a large manufacturing equipment motor may be tens of feet in diameter supplying hundreds of thousands of kilowatts of power. Note that power of electric motors is sometimes expressed in horsepower, where one horsepower equals 746 watts.

Regardless of the type, size, shape, and power level, an electric motor includes a stator and a rotor. The stator includes coils that produce a magnetic field, which causes motion of the rotor (e.g., its output shaft rotates). For radial flux motors, the stator produces a radial flux (e.g., spreading out from the center); while stators of axial flux motors typically produce an axial flux (e.g., located along the plane of the axis).

While a motor contains two primary components (e.g., the stator and the rotor), the manufacturing of a motor is far from a simple process. For instance, manufacturing a DC brushless pancake motor (e.g., a motor whose width is greater than its axial length) requires the development of tooling to produce the components of the motor and/or to assemble the components of the motor. Further, the manufacturing steps of producing the motor can be quite expensive. For instance, a back iron of the stator is fabricated to include mechanical fittings to hold the stator poles in place, which requires special tooling to produce. Then, in manufacturing, the stator poles are physically pressed into the mechanically fittings, which must be done in an identical manner to prevent variations in the mechanically coupling.

For certain applications (e.g., less than 10 horsepower), the cost of tooling and manufacturing has severely limited the production of economical pancake brushless DC (BLDC) motors. Therefore, a need exists for a stator and method of manufacture thereof to produce pancake DC motors and other axial flux motors.

BRIEF DESCRIPTION OF THE SEVERAL VIEWS OF THE DRAWING(S)

DETAILED DESCRIPTION OF THE INVENTION

Figure 1:
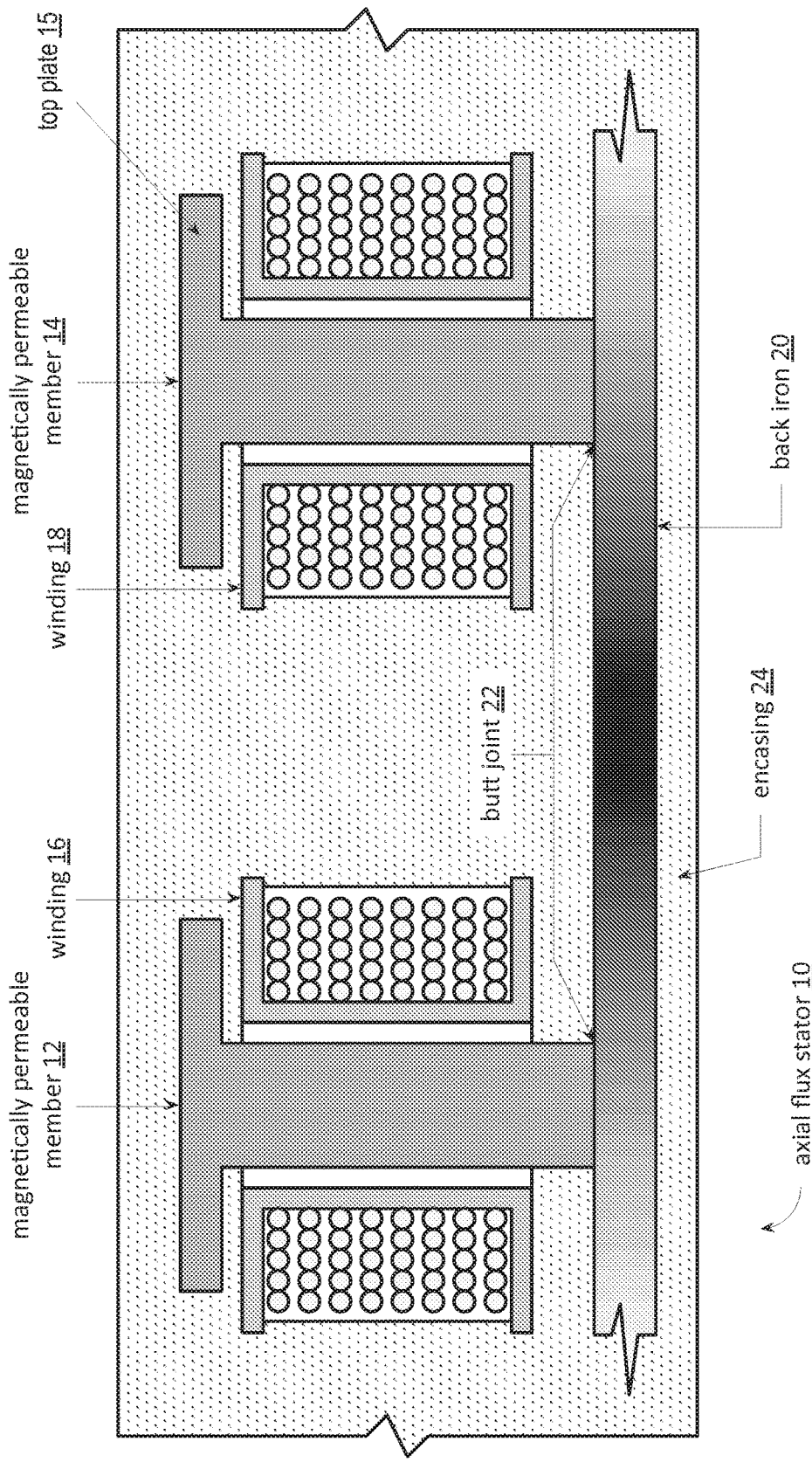
FIG. 1 is a cross-sectional side view diagram of an embodiment of an axial flux stator in accordance with the present invention.

FIG. 1 is a cross-sectional side view diagram of an embodiment of an axial flux stator 10 that includes a plurality of magnetically permeable members 12-14, a plurality of windings 16-18, a back iron 20, and an encasing 24. A magnetically permeable member 12-14 may be one or more of a soft magnetic composite (SMC) stator tooth, a lamination steel stack stator tooth, a formed ferrite material stator tooth, and a steel sheet coil stator tooth. The geometric shape of a magnetically permeable member 12-14 may be a cube, a cylinder, a rectangular cube, a rectangular cube with a top plate 15 (which is illustrated in the present figure), and/or any other shape to provide a stator tooth.

As is shown, the plurality of windings 16-18 are associated with the plurality of magnetically permeable members 12-14 to produce a plurality of winding-magnetically permeable member assemblies or inductance assemblies. For example, a winding 16-18 may include a bobbing that supports a wire coil, wherein the bobbin and the coil of wire are fitted around a corresponding one of the magnetically permeable members 12-14. In another example, the winding 16-18 may be a coil of bondable wire that is fitted around a corresponding one of the magnetically permeable members 12-14.

The back iron 20 may be one or more of a coil of steel ribbon, a plurality of laminated steel sheets, a soft magnetic composite, and a formed ferrite material. In this embodiment, the back iron 20 is mechanically butt joint coupled 22 to the plurality of winding-magnetically permeable member assemblies. As such, the back iron 20 does not include mechanical fittings to couple with the magnetically permeable members. In contrast, the magnetically permeable members 12-14 "sit" on the back iron 20, which reduces the cost of tooling and of manufacturing an axial flux stator.

The encasing 24 may be one or more of an injection molding, a nonmagnetic potting material, a nonmagnetic casting material, and a pre-fabricated housing. For example, the injection molding may be a thermally conductive plastic. The encasing 24 provides holds the back iron 20 and the plurality of winding-magnetically permeable member assemblies together to maintain the butt joint coupling 22 of the back iron 20 to the plurality of winding-magnetically permeable member assemblies.

Figure 2:
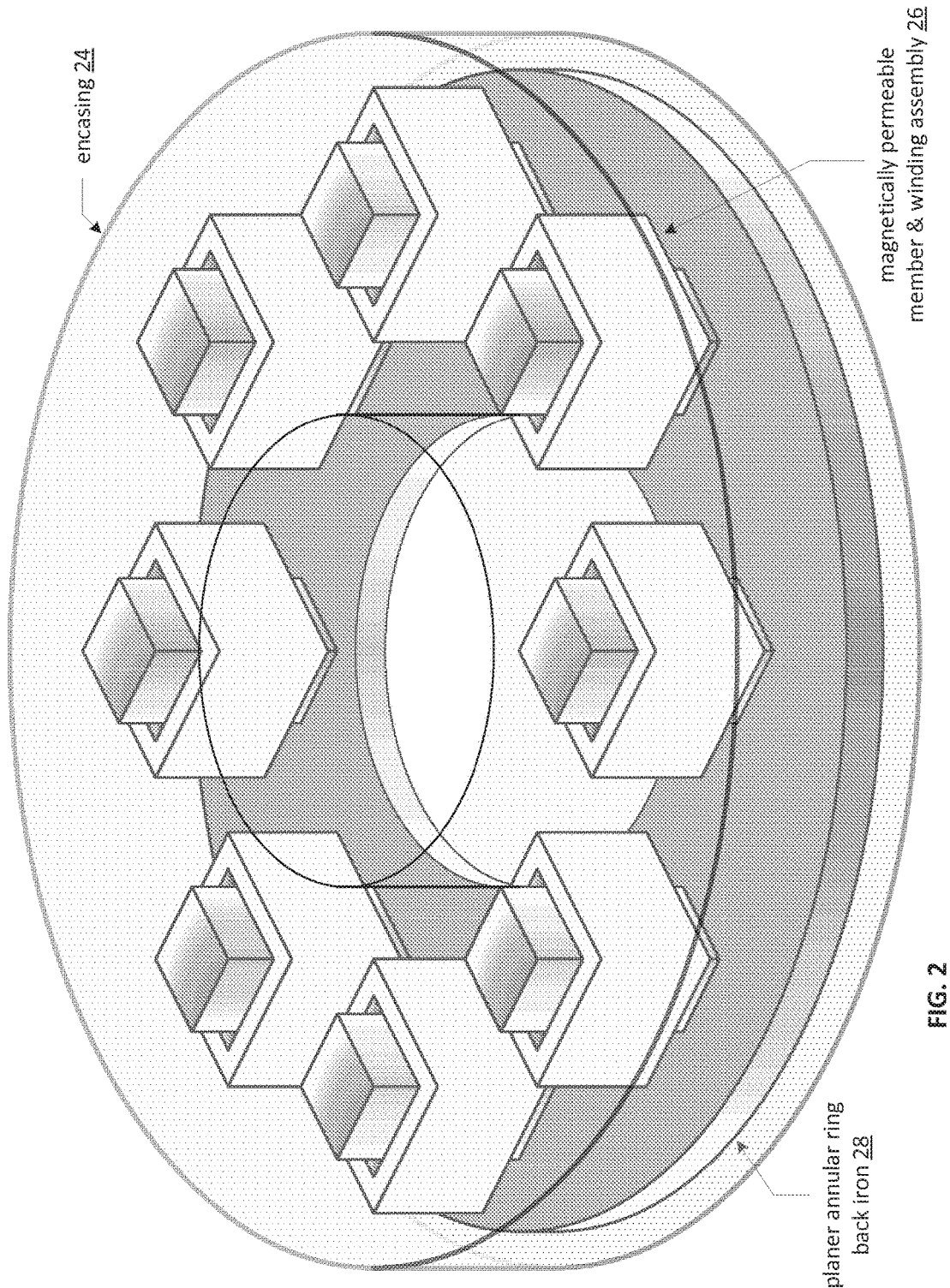
FIG. 2 is a three-dimensional perspective diagram of an embodiment of an axial flux stator in accordance with the present invention.

FIG. 2 is a three-dimensional perspective diagram of an embodiment of an axial flux stator 10 that includes the winding-magnetically permeable member assemblies 26, a planar annular ring back iron 28, and the encasing 24. In this embodiment, the encasing 24 has a geometric shape corresponding to the planar annular ring back iron 28 such that a rotor may at least partial reside within the opening in the center of the encasing 24.

Figure 3:
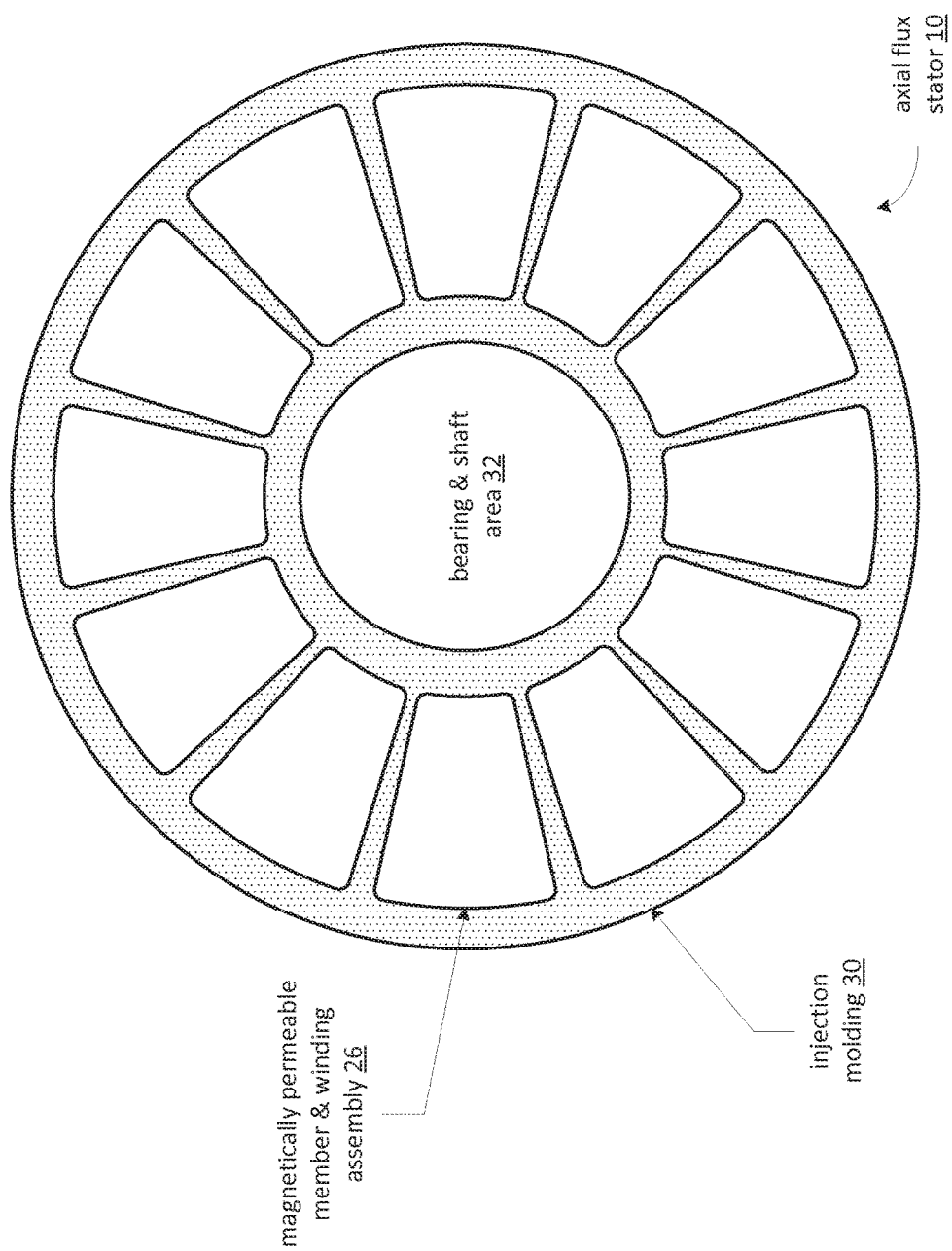
FIG. 3 is a top view diagram of an embodiment of an axial flux stator in accordance with the present invention.
Figure 4:
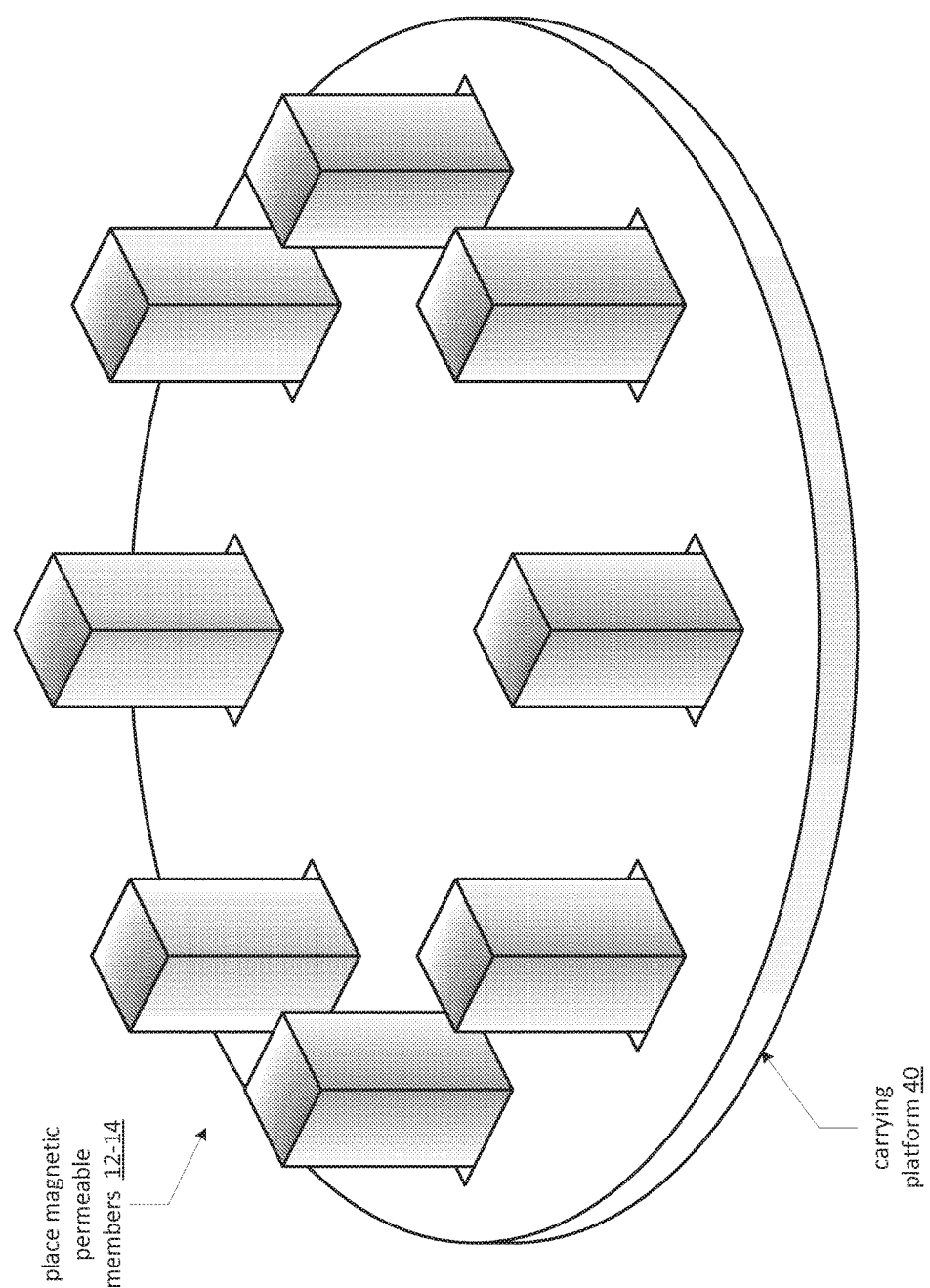
FIGS. 4-8 are diagrams illustrating an example of manufacturing an axial flux stator in accordance with the present invention.

FIG. 3 is a top view diagram of an embodiment of an axial flux stator 10 that includes the plurality of magnetically permeable memory and winding assemblies 26 (e.g., 12 assemblies) and the encasing 24. In this embodiment, the encasing is an injection mold thermally conductive plastic 30. As is shown, the encasing includes an opening that provides a bearing and shaft area 32.

Figure 10:
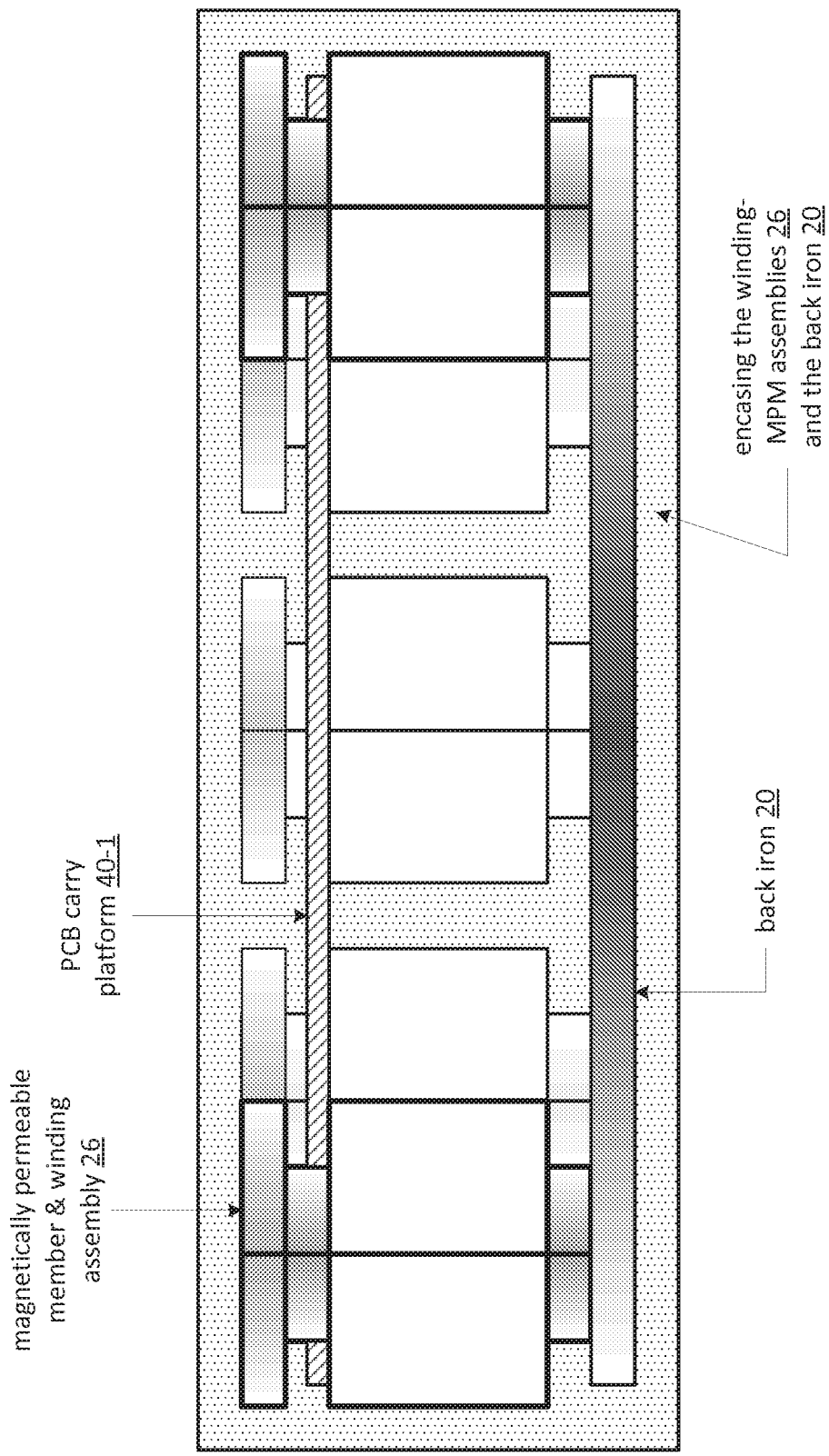
FIG. 10 is a cross-sectional side view diagram of another embodiment of an axial flux stator in accordance with the present invention.

FIGS. 4-8 are diagrams illustrating an example of manufacturing an axial flux stator 10. In FIG. 10, the method of manufacturing begins by placing a plurality of magnetically permeable members 12-14 within a carrying platform 40. The carrying platform 40 may be a pre-formed composite that includes a plurality of receptacles. Each of the receptacles receives one of the magnetically permeable members 12-14 and roughly holds it in a desired position. Such a carrying platform is of modest expense to produce.

Figure 5:
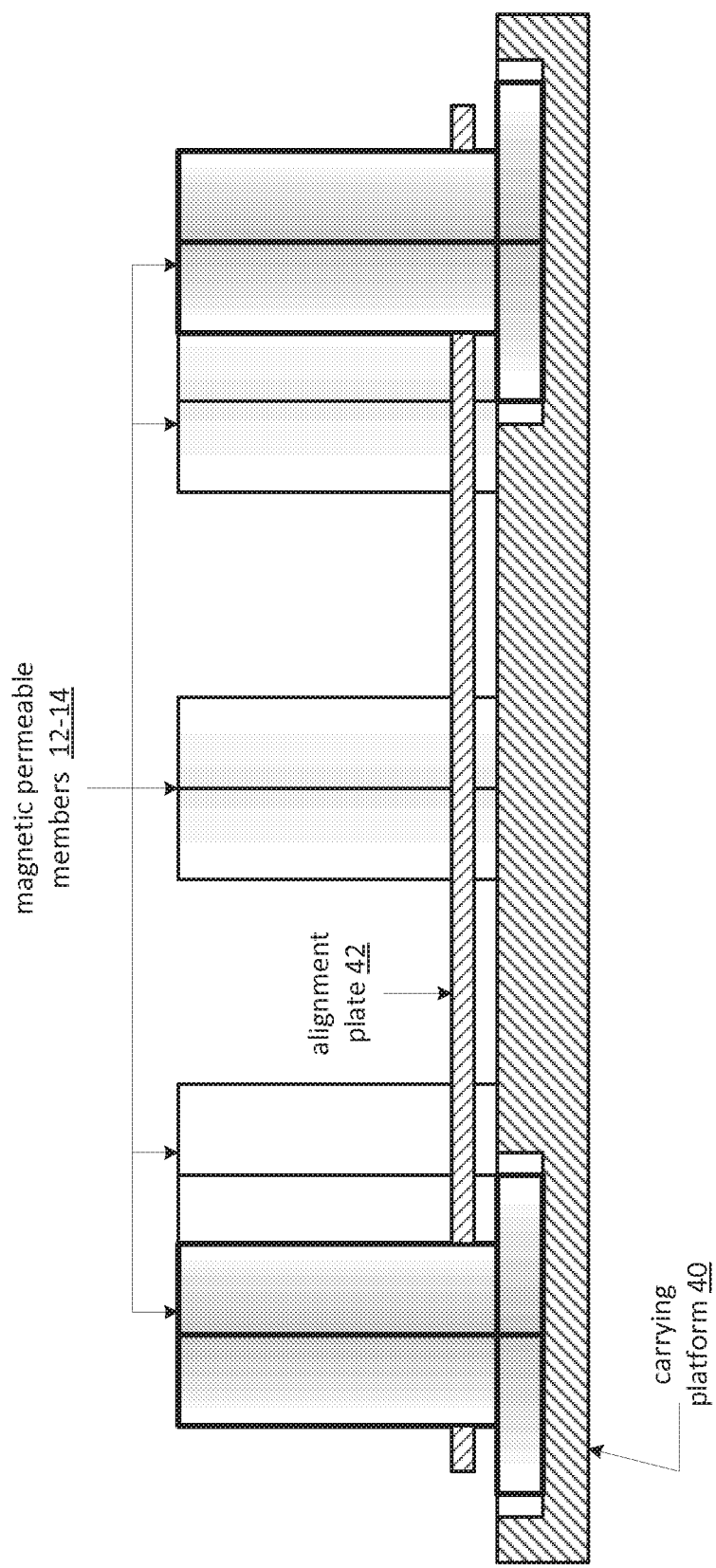

FIG. 5 illustrates a side cross-sectional view of aligning the plurality of magnetically permeable members 12-14 via an alignment plate 42. In this step, the alignment plate 42 adjusts the rough position of the magnetically permeable members 12-14 as established by the carrying platform 40 to a more precise position in three-dimensional space to produce a plurality of aligned magnetically permeable members. The alignment plate 42 may be a die cut plate of various materials, including 10 mil Mylar sheet.

Figure 6:
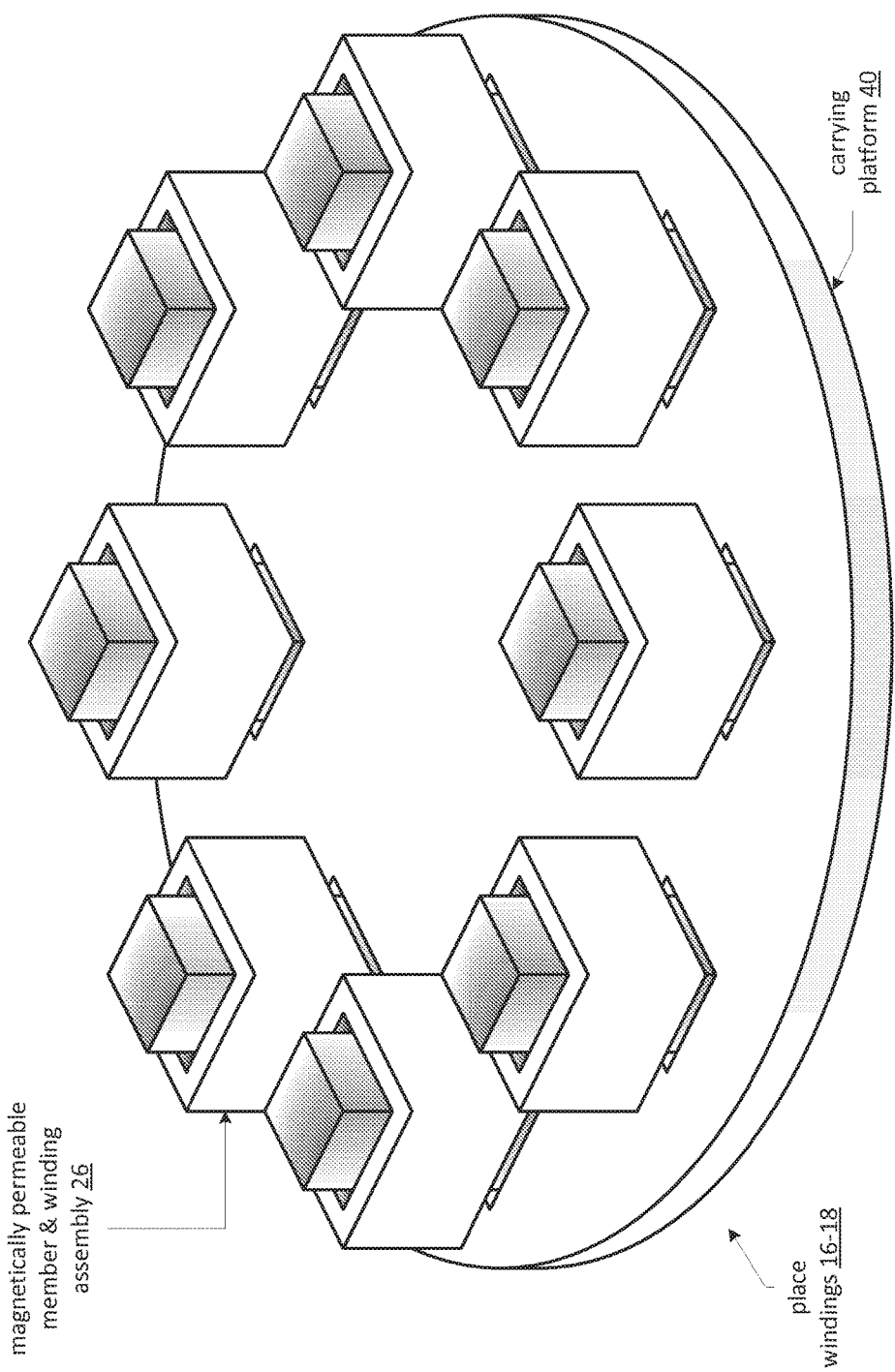

FIG. 6 is a three-dimensional perspective diagram of placing a plurality of windings 16-18 on the plurality of aligned magnetically permeable members 12-14 to produce a plurality of winding-magnetically permeable member assemblies 26. While not specifically shown, the alignment plate 42 maintains the positioning of the magnetically permeable members 12-14 and may provide a reference point for positioning the windings 16-18 on the members 12-14. Note that an adhesive may be used to hold the members 12-14 to the alignment plate 42 and to hold the windings 16-18 to the alignment plate 42 at the desired positioning with respect to the members 12-14.

Figure 7:
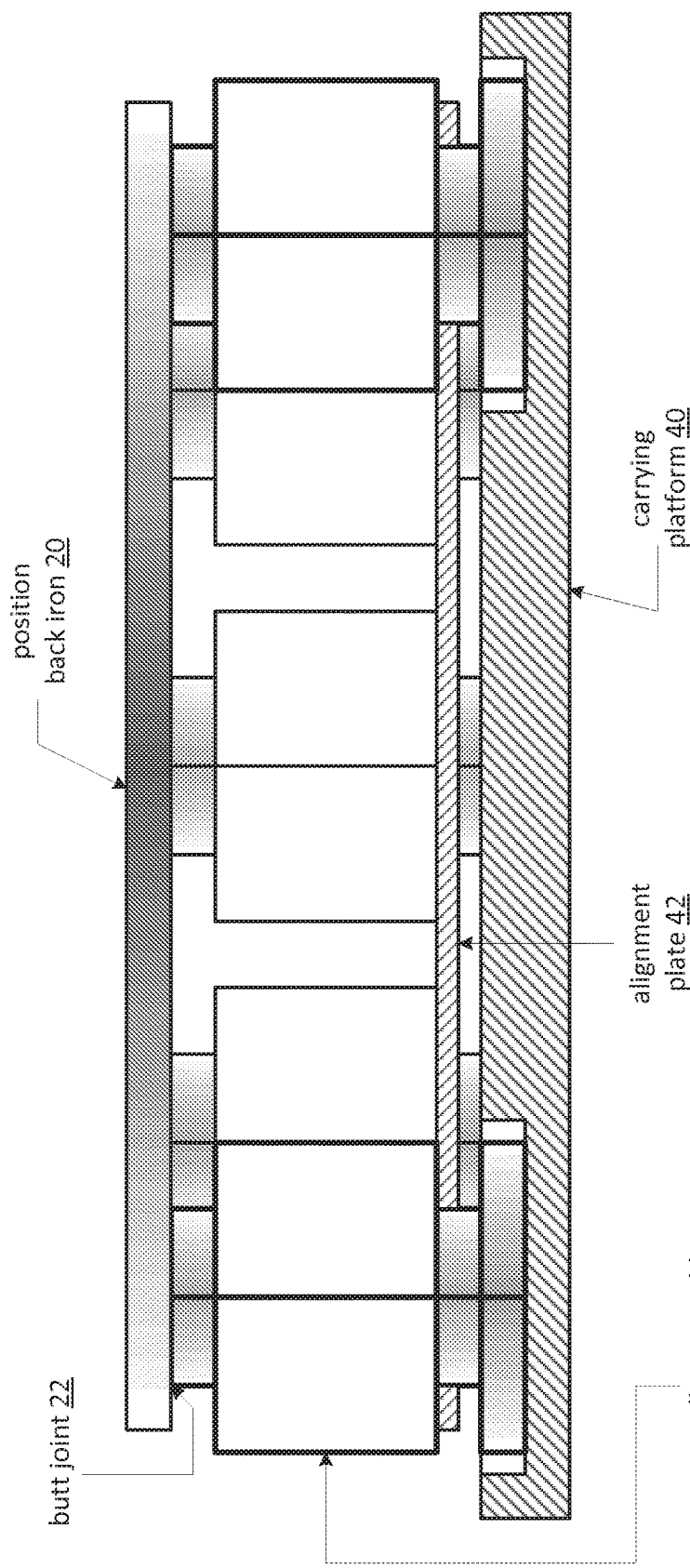

FIG. 7 is a side cross-sectional view of positioning a back iron 20 with respect to the plurality of winding-magnetically permeable member assemblies 26 such that a first primary plane of the back iron creates a plurality of butt joints 22 with the plurality of aligned magnetically permeable members. The butt joints 22 provide the electro-magnetic coupling of the magnetically permeable members 12-14 with the back iron 20. Note that the back iron 20 may be a coil of steel ribbon, a plurality of laminated steel sheets, a soft magnetic composite, and a formed ferrite material and may have a geometric shape of a planar annular ring.

Figure 8:
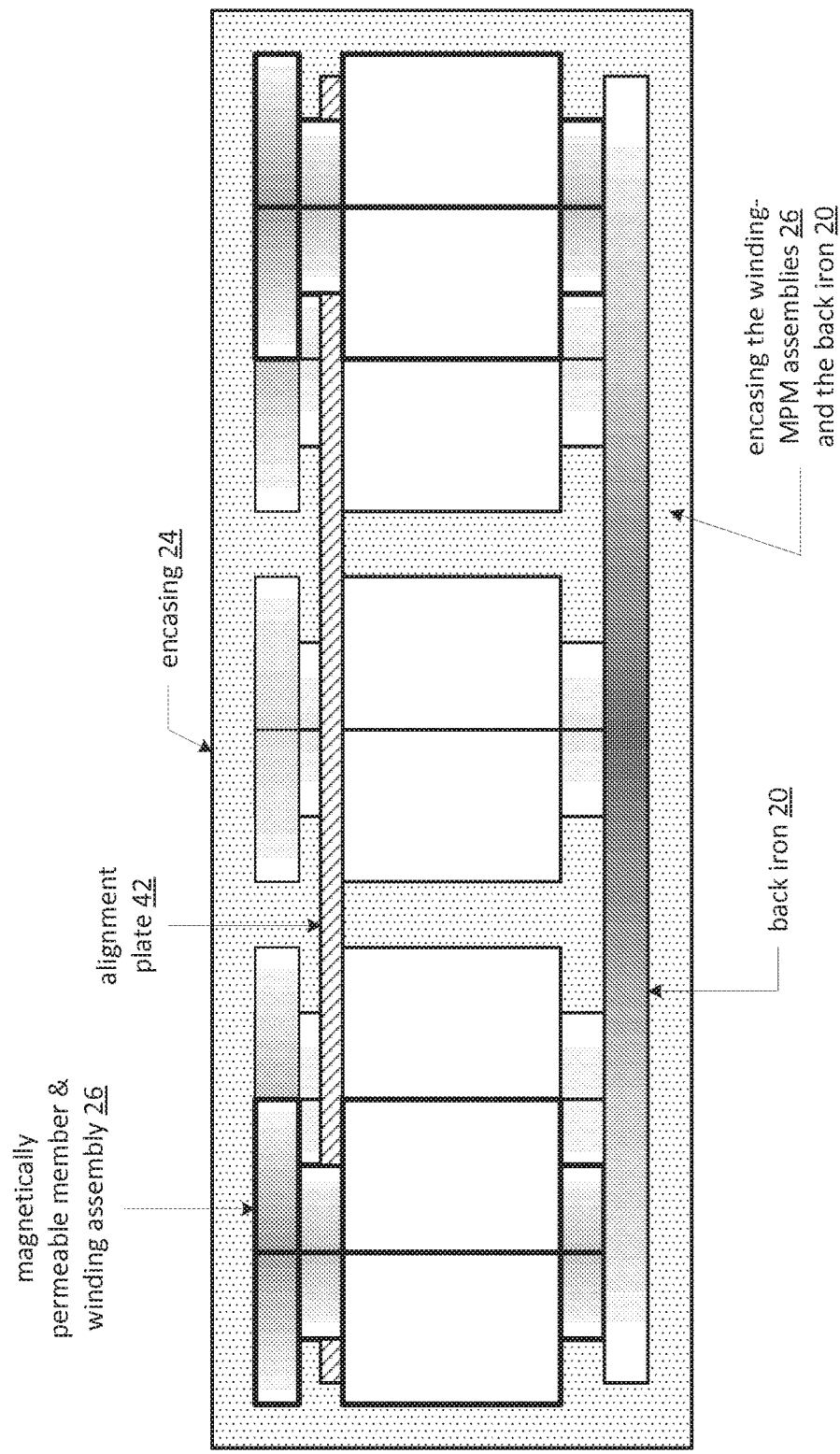

FIG. 8 is a side cross-sectional view of encasing 24 the plurality of winding-magnetically permeable member assemblies 26 and the back iron 20 to maintain the plurality of the butt joints 22. The encasing 24 may be done with an injection-molded plastic, a nonmagnetic casting material, and/or with a nonmagnetic potting material. With such a method of manufacture, tooling costs and manufacturing costs are of a modest expense, making it economically feasible to produce axial flux stators for use in various economical pancake DC motors and/or other axial flux motors.

Figure 9:
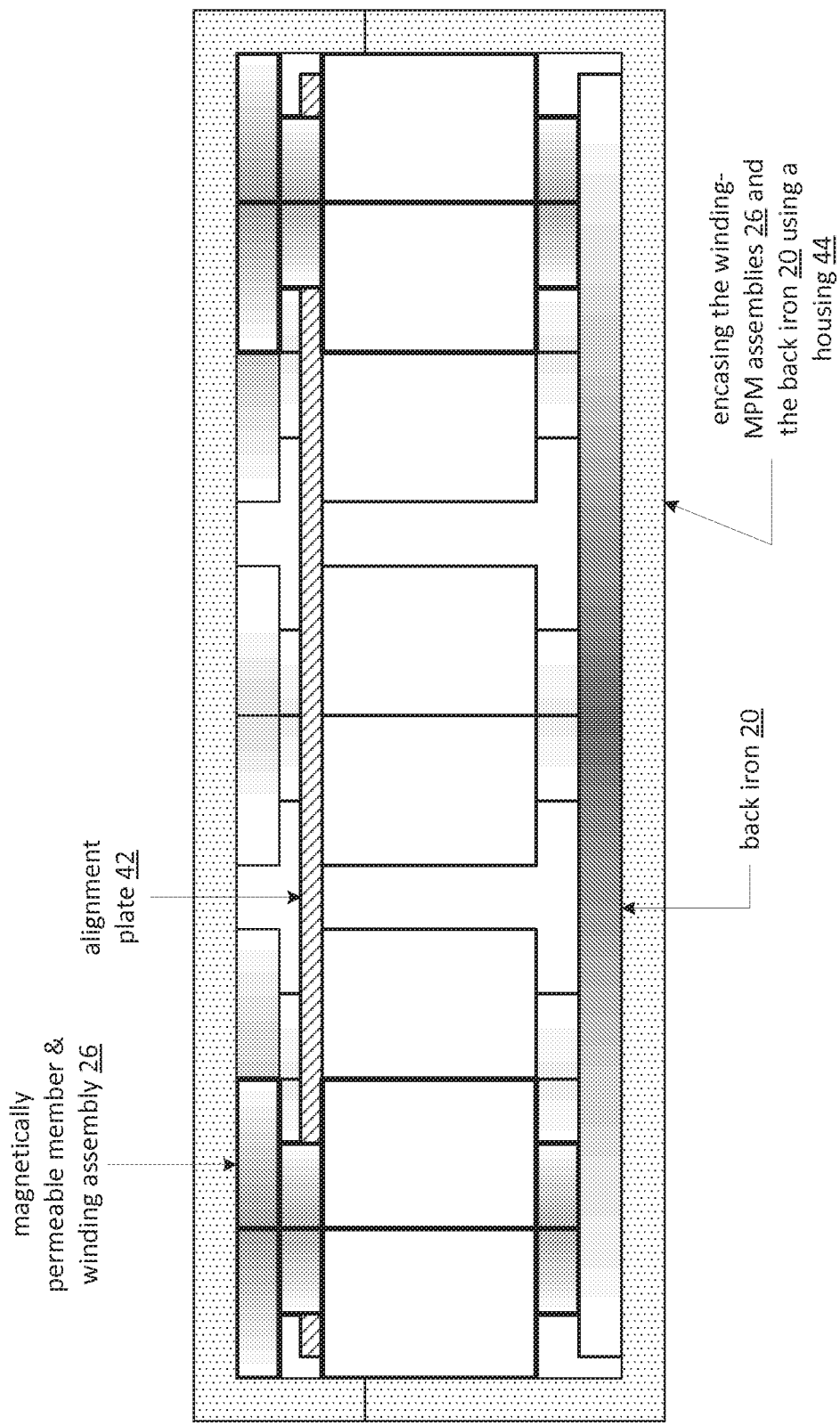
FIG. 9 is a cross-sectional side view diagram of an alternate example of encasing an axial flux stator in accordance with the present invention.

FIG. 9 is a cross-sectional side view diagram of an alternate example of encasing an axial flux stator 10. In this embodiment, the encasing is done via a pre-fabricated housing 44. The pre-fabricated housing 44 may be composed of an injection-molded plastic, a nonmagnetic potting material, and/or nonmagnetic casting material. The housing 44 may have two pieces that are mechanically couple them together.

FIG. 10 is a cross-sectional side view diagram of another embodiment of an axial flux stator 10 where the alignment plate 42 is replaced with a printed circuit board (PCB) 40-1. In an embodiment, the PCB platform 40-1 may have a plurality of traces for coupling to the plurality of windings. In another embodiment or in furtherance of the preceding embodiment, the PCB platform 40-1 may include a plurality of PCB windings coupled to the plurality of windings.

Figure 11:
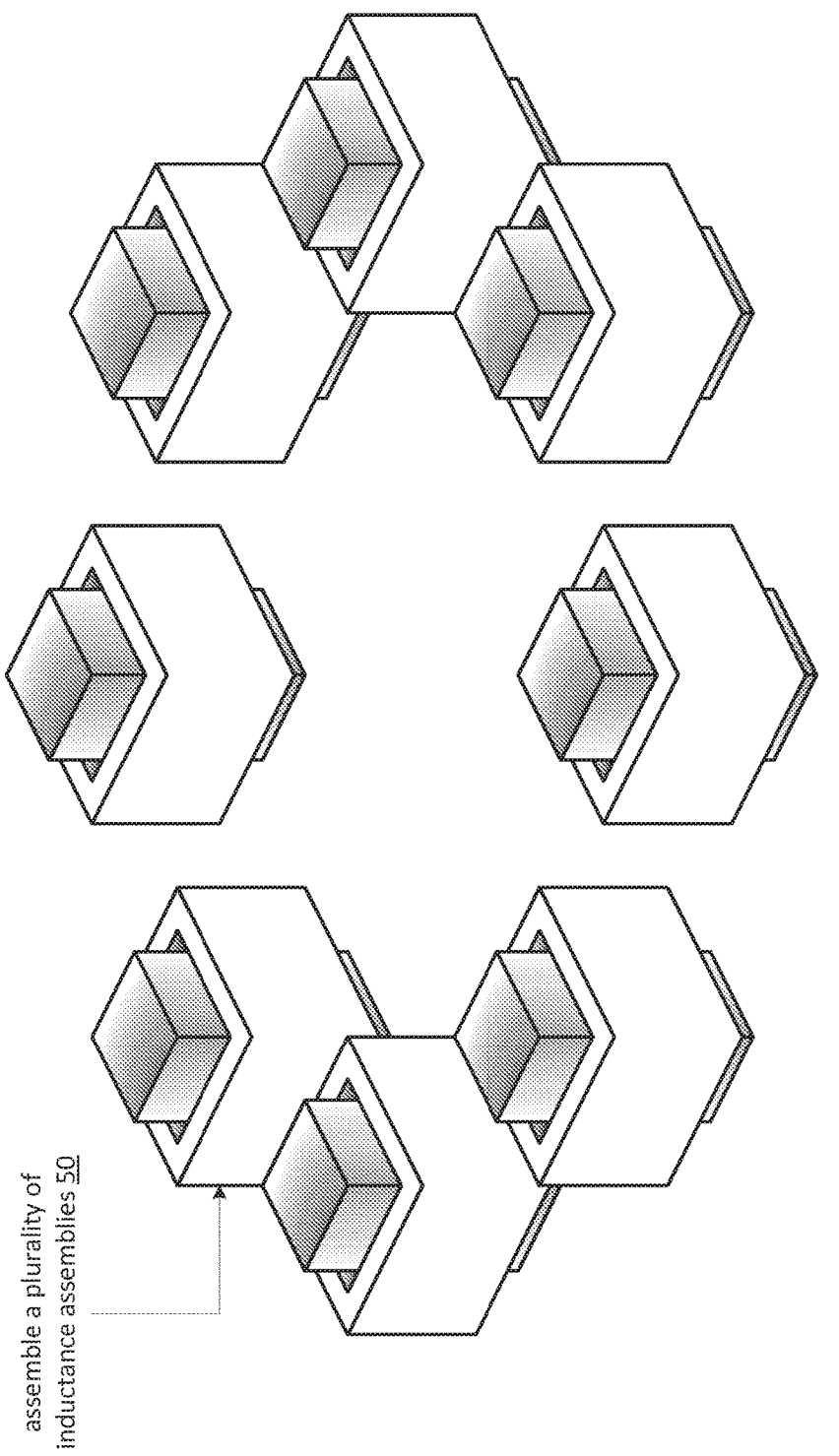
FIGS. 11-13 are diagrams illustrating another example of manufacturing an axial flux stator in accordance with the present invention.
Figure 12:
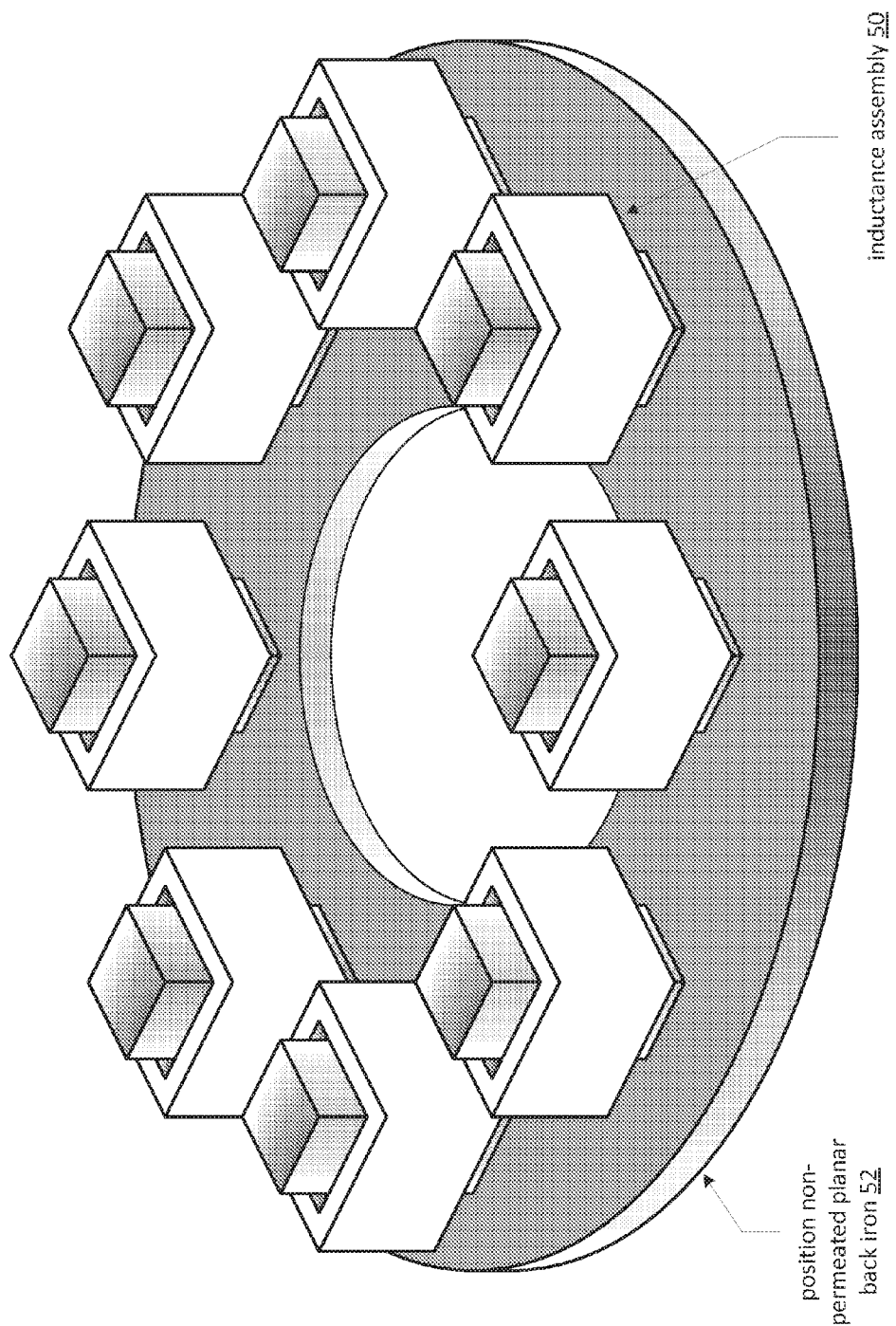
Figure 13:
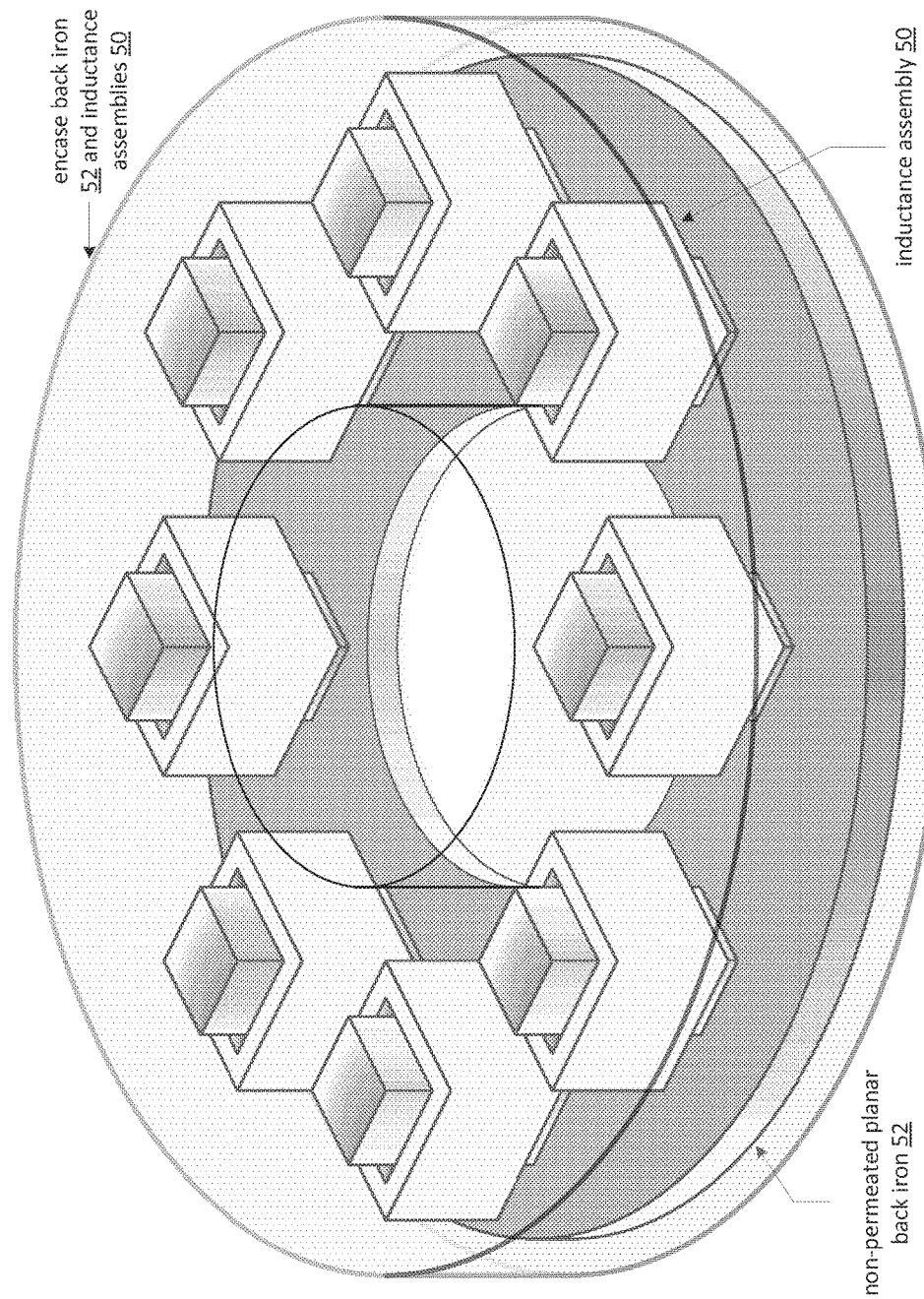

FIGS. 11-13 are diagrams illustrating another example of manufacturing an axial flux stator 10. FIG. 11 is a three-dimensional perspective view diagram of assembling a plurality of inductance structures 50 to produce a plurality of stator poles. An inductance structure 50 includes a winding wrapped around a magnetically permeable member. The magnetically permeable member may be one or more of a soft magnetic composite stator tooth, a lamination steel stack stator tooth, a formed ferrite material stator tooth, and a steel sheet coil stator tooth. The winding may be a bobbin supporting a wire coil and/or a coil of bondable wire.

FIG. 12 is a three-dimensional perspective view diagram of positioning a non-permeated planar back iron 52 with respect to the plurality of inductance structures 50 to create a substantially air-gapless magnetic coupling between the non-permeated planar back iron and the plurality of inductance structures. The non-permeate planar back iron 52 does not include mechanical fittings to couple with the magnetic permeable members of the inductance assembles 50 and may have a planar annular ring shape. Further, the non-permeable planar back iron 52 may be one or more of a coil of steel ribbon, a plurality of laminated steel sheets, a soft magnetic composite, and a formed ferrite material.

FIG. 13 is a three-dimensional perspective view diagram of encasing the plurality of inductance structures 50 and the non-permeated planar back iron 52 to maintain the substantially air-gapless magnetic coupling. The encasing may be one or more of injection molding the plurality of inductance structures and the non-permeated planar back iron, potting, with a nonmagnetic potting material, the plurality of inductance structures and the non-permeated planar back iron, casting, with a nonmagnetic casting material, the plurality of inductance structures and the non-permeated planar back iron, and assembly the plurality of inductance structures and the non-permeated planar back iron within a pre-fabricated housing.

With such a method of manufacture as described in FIGS. 11-13 an axial flux stator having a plurality of inductance structures, a non-permeated planar back iron, and an encasing is economically produced. In an embodiment, an inductance structure includes a winding wrapped around a magnetically permeable member, which is substantially air-gapless magnetic coupled to the non-permeated planar back iron. The encasing maintains the substantially air-gapless magnetic coupling between the plurality of inductance structures and the non-permeated planar back iron.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method of manufacturing an axial flux stator, the method comprises:
   placing a plurality of magnetically permeable members within a carrying platform;
   aligning the plurality of magnetically permeable members via an alignment plate to produce a plurality of aligned magnetically permeable members;
   placing a plurality of windings on the plurality of aligned magnetically permeable members to produce a plurality of winding-magnetically permeable member assemblies;
   positioning a back iron with respect to the plurality of winding-magnetically permeable member assemblies such that a first primary plane of the back iron creates a plurality of butt joints with the plurality of aligned magnetically permeable members; and
   encasing the plurality of winding-magnetically permeable member assemblies and the back iron to maintain the plurality of butt joints.

2. The method of claim 1, wherein the step of encasing the plurality of winding-magnetically permeable member assemblies and the back iron comprises at least one of:
   injection molding the plurality of winding-magnetically permeable member assemblies and the back iron;
   potting, with a nonmagnetic potting material, the plurality of winding-magnetically permeable member assemblies and the back iron;
   casting, with a nonmagnetic casting material, the plurality of winding-magnetically permeable member assemblies and the back iron; and
   assembling the plurality of winding-magnetically permeable member assemblies and the back iron within a pre-fabricated housing.

3. The method of claim 1, wherein a magnetically permeable member of the plurality of magnetically permeable members comprises at least one of:
   a soft magnetic composite stator tooth;
   a lamination steel stack stator tooth;
   a formed ferrite material stator tooth; and
   a steel sheet coil stator tooth.

4. The method of the claim 1, wherein a winding of the plurality of windings comprises at least one of:
   a bobbin supporting a wire coil; and
   a coil of bondable wire.

5. The method of claim 1, wherein the carrying platform comprises at least one of:
   a pre-formed composite that includes a plurality of receptacles;
   a printed circuit board (PCB) having a plurality of traces for coupling to the plurality of windings; and
   a printed circuit board (PCB) having a plurality of PCB windings, wherein the plurality of PCB windings couple to the plurality of windings.

6. The method of claim 1, wherein the back iron comprises at least one of:
   a coil of steel ribbon;
   a plurality of laminated steel sheets;
   a soft magnetic composite; and
   a formed ferrite material.

7. The method of claim 1, wherein the back iron comprises a planar annular ring shape.

\* \* \* \* \*